(12) United States Patent
Hahn

(10) Patent No.: US 8,020,370 B2
(45) Date of Patent: Sep. 20, 2011

(54) LAMBDA CONTROLLER WITH BALANCING OF THE QUANTITY OF OXYGEN

(75) Inventor: Hermann Hahn, Hannover (DE)

(73) Assignee: Volkswagen AG, Wolfsburg (DE)

( * ) Notice: Subject to any disclaimer, the term of this patent is extended or adjusted under 35 U.S.C. 154(b) by 709 days.

(21) Appl. No.: 12/066,342

(22) PCT Filed: Sep. 6, 2006

(86) PCT No.: PCT/EP2006/008690
§ 371 (c)(1),
(2), (4) Date: May 20, 2008

(87) PCT Pub. No.: WO2007/033769
PCT Pub. Date: Mar. 29, 2007

(65) Prior Publication Data
US 2008/0210209 A1    Sep. 4, 2008

(30) Foreign Application Priority Data

Sep. 19, 2005   (DE) .................. 10 2005 044 729

(51) Int. Cl.
*F01N 3/00* (2006.01)
(52) U.S. Cl. .............. 60/285; 60/274; 60/276; 701/103; 701/109
(58) Field of Classification Search .............. 60/274, 60/276, 277, 285; 701/103, 109
See application file for complete search history.

(56) References Cited

U.S. PATENT DOCUMENTS

| | | | | |
|---|---|---|---|---|
| 5,836,153 A * | 11/1998 | Staufenberg et al. | ........... | 60/274 |
| 5,901,552 A * | 5/1999 | Schnaibel et al. | ............... | 60/274 |
| 6,116,021 A * | 9/2000 | Schumacher et al. | ........... | 60/274 |
| 6,188,953 B1 | 2/2001 | Yasui et al. | ................... | 701/109 |
| 6,253,542 B1 * | 7/2001 | Omara et al. | ................... | 60/274 |
| 6,311,680 B1 | 11/2001 | Bradley, Sr. et al. | .......... | 123/672 |
| 6,453,665 B1 * | 9/2002 | Bower et al. | .................... | 60/285 |
| 7,240,479 B1 * | 7/2007 | Fujimoto | ........................ | 60/277 |
| 7,474,956 B2 * | 1/2009 | Nakagawa et al. | ........... | 701/109 |
| 2004/0244363 A1 | 12/2004 | Makki et al. | ................... | 60/285 |

FOREIGN PATENT DOCUMENTS

| | | |
|---|---|---|
| DE | 19922175 | 12/1999 |
| EP | 1681448 | 12/2004 |
| WO | 02/070884 | 9/2002 |

OTHER PUBLICATIONS

Internatinal Search Report; PCT/EP2006/008690; pp. 6, Jan. 31, 2007.

* cited by examiner

*Primary Examiner* — Binh Q. Tran

(74) *Attorney, Agent, or Firm* — King & Spalding L.L.P.

(57) ABSTRACT

In a method for the lambda control in an internal combustion engine with at least one catalytic converter, with the exhaust system being provided with front and rear lambda control circuits lambda with at least one rear oxygen sensor downstream in reference to the catalytic converter, with an output signal of the rear oxygen sensor being processed by the rear lambda control circuit, a difference value being formed to a rear target lambda value, and an actuating variable being formed acting on the target lambda value of the front lambda control circuit it is provided that after a change of the algebraic sign of the difference value a balanced oxygen amount is determined for a time interval since the sign change from the oxygen amount entered into and removed from the catalytic converter and the actuating variable of the rear lambda control circuit being selected depending on the balanced oxygen amount.

20 Claims, 1 Drawing Sheet

LAMBDA CONTROLLER WITH BALANCING OF THE QUANTITY OF OXYGEN

CROSS-REFERENCE TO RELATED APPLICATIONS

This application is a U.S. national stage application of International Application No. PCT/EP2006/008690 filed Sep. 6, 2006, which designates the United States of America, and claims priority to German application number 10 2005 044 729.5 filed Sep. 19, 2005, the contents of which are hereby incorporated by reference in their entirety.

TECHNICAL FIELD

The invention relates to a method for the lambda regulation in an internal combustion engine as well as a device for the lambda regulation.

BACKGROUND

Methods and devices for an lambda regulation in internal combustion engines are used to reduce the emission of damaging exhaust gases into the environment if the at least one catalytic converter is arranged in the exhaust system of the internal combustion engine. In order to maintain a 3-way catalytic converter in an optimal operating state it is necessary to control the fuel-mixture generation of the internal combustion engine using an lambda control such that at least a mean lambda ratio develops as closely as possible approximating 1.0. Here, it is known to provide a front lambda control circuit with a front oxygen sensor, arranged downstream in reference to the internal combustion engine and upstream in reference to the catalytic converter, and a rear lambda control circuit with at least one rear oxygen sensor, arranged downstream in reference to the catalytic converter. It is disadvantageous that such systems react somewhat slowly so that undesired emissions bursts can occur, in which the catalytic converter is briefly outside the optimal operating state. Therefore it has been attempted to optimize the quality of the control by improving the processing of the signals from the sensors. The publications DE 102 25 937 A1, DE 196 06 652 A1, and DE 103 39 063 A1 show such systems, for example.

It is possible to detect the behavior of the catalytic converter or to model it such that an intervention occurs already before the rear sensor detects any deviation from the target value. In particular, it can be beneficial to use a catalytic converter model for detecting presently stored oxygen amounts because the oxygen stored in the catalytic converter largely influences the conversion of contaminants and the reaction of the sensor signal. Information concerning the present oxygen status of the catalytic converter can be used in different ways for improving the lambda control. This includes the modification or amendment of control algorithms. From the publication DE 102 46 505 A1 a method is known for heating catalytic converters by alternating charges with sub- and super-stoichiometric exhaust gas. Here, a limit is set for the present oxygen storage capacity of the catalytic converter which is modeled by age and temperature or which can be determined by experimentally forced bursts. The flow of exhaust gas is multiplied by the respective relative oxygen surplus or oxygen demand and the product is integrated over time. When the limit is reached the phase is changed.

One problematic disadvantage of this approach is the fact that the present oxygen status of the catalytic converter must be determined very precisely and furthermore a precise description of the correlation between the oxygen status and the conversion performance of the catalytic converter is necessary when the lambda control shall be improved, because otherwise any deviation from the model behavior results in an insufficient reaction of the regulator. It is understood that it is also possible to determine which time is to be assumed at which the model of the oxygen storage capacity of the catalytic converter no longer sufficiently describes the real behavior and at which the information of the present oxygen state of the catalytic converter is waived. In this case the lambda control must be performed in a conventional manner entirely based on the signal of the oxygen sensors.

SUMMARY

A lambda control for internal combustion engines can be provided allowing for a cleaning exhaust gas as good as possible. According to an embodiment, a method for an lambda control of an internal combustion engine with at least one catalytic converter allocated to an exhaust system of the internal combustion engine, with the exhaust system comprising a front lambda control circuit and a rear lambda control circuit with at least one rear oxygen sensor arranged downstream in reference of the catalytic converter, may comprise the steps of: processing an output signal of the rear oxygen sensor by the rear lambda control circuit, forming a difference value in reference to a target lambda value, and issuing an actuating variable influencing the front lambda control circuit, and after a change of the algebraic sign of the difference value, determining a balanced oxygen amount for a temporal interval since the change of the algebraic sign from the oxygen amount entered into the catalytic converter and removed therefrom, and selecting the actuating variable of the rear lambda control circuit additionally depending on the balanced oxygen amount.

According to a further embodiment, the method may comprise the additional step of forming an evaluation parameter to increase regulator stability depending on the balanced oxygen amount. According to a further embodiment, the method may comprise the additional step of determining an actuating variable acting on the control parameter of the rear lambda control circuit using an engine map, which processes the output signal of the rear oxygen sensor and the evaluation parameter as an input parameter and/or determining a correction factor for the actuating variable. According to a further embodiment, an absolute evaluation parameter may be used. According to a further embodiment, a relative evaluation parameter can be used based on a predetermined oxygen storage capacity of the catalytic converter. According to a further embodiment, the predetermined oxygen storage capacity can be a maximum oxygen storage capacity of the catalytic converter. According to a further embodiment, the predetermined oxygen storage capacity may be equivalent to a maximum conversion of contaminants for a predetermined contaminant, preferably NOX, HC, or CO content of an exhaust gas of the internal combustion engine. According to a further embodiment, the evaluation parameter and/or the predetermined oxygen storage capacity may be selected depending on the actual value of a parameter of the catalytic converter. According to a further embodiment, the present value of the parameter of the catalytic converter may be equivalent to a catalytic converter being completely stocked with oxygen and/or the oxygen being completely removed therefrom. According to a further embodiment, the front lambda control circuit can be provided with a front oxygen sensor arranged downstream in reference to the internal combustion engine and upstream in reference to the catalytic converter or that a modeled lambda ratio is provided for the front lambda control circuit. According to a further embodiment, the inserted and removed oxygen amount can be considered for the determination of the balanced oxygen amount resulting from the intervention of the rear control circuit. According to a further embodiment, a projected balancing of the oxygen amount can be used for the front control circuit at a location downstream in reference to the internal combustion engine and upstream in reference to the catalytic converter.

According to another embodiment, a device for the lambda control in an internal combustion engine may comprise at least one catalytic converter arranged in an exhaust system of the internal combustion engine, wherein the exhaust system is provided with a front lambda control circuit and a rear lambda control circuit having at least one rear oxygen sensor arranged downstream in reference to the catalytic converter and wherein the rear lambda control circuit is operable to process an output signal of the rear oxygen sensor, to form a difference value to the rear target lambda value and to output an actuating variable acting on the target lambda value of the front lambda control circuit, further comprising a device operable to determine a balanced oxygen amount of the catalytic converter from the oxygen amounts entered into and removed from the catalytic converter and to determine the balanced oxygen amount after a change of the algebraic sign of the difference value for a time interval after the change of the algebraic sign and wherein the rear lambda control circuit is designed to determine the actuating variable in addition depending on the balanced oxygen amount.

According to a further embodiment, the actuating variable of the rear lambda control circuit may act on a target lambda path of the front lambda control circuit. According to a further embodiment, the front lambda control circuit may be provided with a front oxygen sensor arranged downstream in reference to the internal combustion engine and upstream in reference to the catalytic converter. According to a further embodiment, the device for determining the balanced oxygen amount may comprise an integrator to determine the entered oxygen amount.

BRIEF DESCRIPTION OF THE DRAWINGS

In the following, an exemplary embodiment of the invention is explained in greater detail using the drawing.

DETAILED DESCRIPTION

Figure 1:
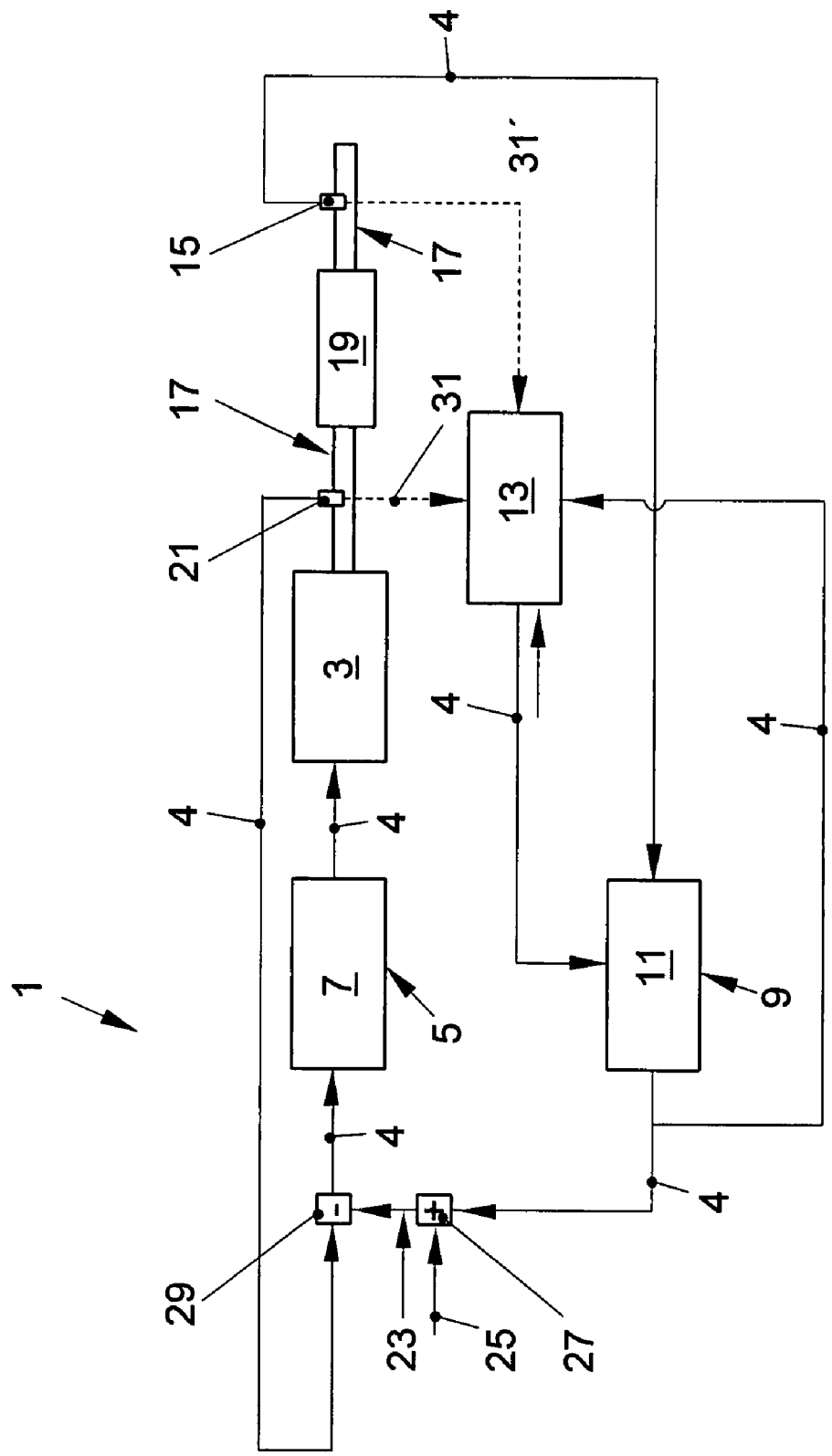
FIG. 1: shows a block diagram of a device for the lambda control in an internal combustion engine with a front and a rear lambda control circuit and an oxygen model.

The method according to an embodiment is characterized in that after the change of the algebraic sign the difference value of an initial signal of the rear oxygen sensor is determined for a rear target lambda ratio from the amount of oxygen input and output for the time interval since the change of the algebraic signs and the actuating variable of the rear lambda control circuit is selected in addition to the output signal of the rear oxygen sensor depending on the balanced amount of oxygen. The actuating variable, i.e. the control parameter of the rear lambda control circuit, is selected depending on the output signal and also depending on the balance of the oxygen amount. The balance of the oxygen amount of the catalytic converter can be determined relatively easily and allows in a simple manner to use information concerning the oxygen status of the catalytic converter to improve the lambda control. The adjustment action of the rear control is therefore dependent on the signal of the rear oxygen sensor and additionally on the balance of the oxygen amount (balanced oxygen amount) of the catalytic converter.

In the following the procedure shall be illustrated when an output signal of the rear oxygen sensor detects exhaust to be too rich. In this case, the exhaust gas shall be made leaner until the output signal has dropped back to the target value. According to an embodiment, the balanced oxygen amount is determined after the change of the algebraic sign of the difference value. Depending on the balanced oxygen amount it can be determined if it is necessary to charge the catalytic converter with more oxygen. If a sufficient amount of oxygen is present in the catalytic converter for converting the contaminants present, it is only a matter of time until the output signal of the rear sensor moves towards the target value at the present value of the actuating variable, due to the buffer effect of the catalytic converter, particularly the conventional catalytic converter coatings. The value of the actuating variable is therefore corrected. In particular the actuating variable can be reduced. If on the other hand, for example by dynamic processes in the catalytic converter, more oxygen is removed from the catalytic converter, a change of the balanced oxygen amount results and an increase of the actuating variable may be considered. The process is similarly but inverse when the exhaust gas shall be enriched.

Preferably it is provided to evaluate the balanced oxygen amount and for this purpose to form an evaluation parameter depending on the balanced oxygen amount.

In a preferred embodiment it is provided to determine a control parameter acting on the actuating variable of the rear control circuit using an ignition map. The ignition map uses the output signal of the rear oxygen sensor and the balanced oxygen amount as the input amounts and determines the control parameter. The control parameter may be, for example, a proportional parameter and/or an integral parameter.

Preferably it is provided, alternatively or additionally, to form a corrective value to increase control stability depending on the balanced oxygen amount.

An absolute evaluation parameter can be used, with preferably an absolute oxygen storage amount being predetermined, which is independent from the actually existing oxygen storage capacity of the catalytic converter.

Further, a relative evaluation parameter can be determined from the balanced oxygen amount reference to a given oxygen storage capacity of the catalytic converter. Preferably, for example, the presently balanced oxygen amount can be referenced to the overall balanced oxygen amount with a previously reverse algebraic sign and a relative ratio determined therefrom.

Preferably, the predetermined oxygen storage capacity represents a maximum oxygen storage capacity of the catalytic converter. Further, the predetermined oxygen storage capacity is equivalent to a maximum exhaust conversion for a given contaminant of the exhaust gas of the internal combustion engine, preferably a NOX, HC, or CO-portion of the exhaust. In both cases a simple adjustment of the lambda control to the features of the catalytic converter can be achieved.

It is further advantageous to select the evaluation parameter and/or the predetermined oxygen storage capacity depending on the present value of a parameter of the catalytic converter. Preferably the value prior to the time the algebraic sign changed is selected as the present value of a parameter of the catalytic converter. The parameter of the catalytic converter can characterize the catalytic converter to be completely filled or completely cleared of oxygen. Such conditions are to be expected after a prior drive phase or a saturated operating phase of the internal combustion engine and thus it can easily be detected or projected.

According to an embodiment it is therefore possible to design the control anticipatory, and thus to considerably improve the control quality. For example it can be detected that, based on a completely filled catalytic converter and a sensor signal of the rear oxygen sensor equivalent to a lean mix, a strong enrichment can be performed. Advantageously the enrichment can be reduced prior to resulting in an emissions burst, as soon as the balanced oxygen amount reaches an oxygen fill level with an optimum value ranging from 40 to 60%, for example. In a technically simple control the enrichment is reduced in spite of the sensor signal still deviating from its target value.

The method according to an embodiment can be applied both when the front lambda circuit is provided with a front oxygen sensor arranged downstream in reference to the internal combustion engine and upstream in reference to the catalytic converter or when a modeled lambda value is provided to the front lambda control circuit.

According to another embodiment, a device may be provided for determining a balanced oxygen amount of the catalytic converter from the oxygen amounts entered into and removed from the catalytic converter, with, after the change of the algebraic sign of the difference value, the balanced oxygen amount being determined for a time interval after the change of the algebraic sign and with the rear lambda control circuit being designed, to additionally determine the actuating variable depending on the balanced oxygen amount.

FIG. 1 shows a block diagram of a device 1 for the lambda control in an internal combustion engine 3. Signal connections and their directions are indicated by arrows 4. The device 1 is provided with a front control circuit 5 with a front regulator 7 and a rear control circuit 9 with a rear regulator 11. The rear regulator 11 is connected at the input side with a modeling unit 13 and a rear oxygen sensor 15. The rear oxygen sensor 15 is located in an exhaust system 17 of the internal combustion engine 3 downstream in reference to the catalytic converter 19. Downstream in reference to the internal combustion engine 3 and upstream in reference to the catalytic converter 19 a front oxygen sensor 21 is arranged in the exhaust system 17. The oxygen sensors 15, 21 can represent a staggered and/or broadband sensor, for example. The output signal of these sensors can optionally be fed directly in a device 13 explained in greater detail in the following, as discernible from arrows 31 and 31'. In another embodiment, not shown in FIG. 1, there is no lambda sensor 21 implemented in the front lambda control circuit. Instead, a modeled lambda value is provided, determined for example from engine parameters, such as amount of fuel injected and amount of air as well as adapted actuating variables and/or more complex models and used instead of a measured lambda value.

The device 1 and/or the front control circuit 5 is provided with a target value path 23 having a target value input 25. An addition site 27 is connected to the target value path 23. The addition site 27 of the target value path 23 is allocated at the input side to the target value input 25 and the rear regulator 11. Therefore, the actuating variable of the rear regulator 11 is added to the target value of the lambda control by the addition site 27. This adjustment process of the rear regulator 11 exclusively acts via the target value path 23 of the front control circuit 5 on the fuel-mixture generation of the internal combustion engine 3 and therefore on the lambda ratio of the exhaust gas of the internal combustion engine 3.

The front control circuit 5 operates independently, is only guided by the actuating variable of the rear control circuit 9, and includes the target value path 23, a subtraction site 29 for the formation of a deviation from the target value fed via the target value path 23, and the output signal of the front oxygen sensor 21, the front regulator 7, the internal combustion engine 3, as well as its exhaust system 17 with the front oxygen sensor 21. The rear control circuit 9 operates as a superior regulator and therefore includes the entire front control circuit 5 and additionally the catalytic converter 19, the rear oxygen sensor 19 located downstream thereof, and the device 13.

From the oxygen amount entered into and removed from the catalytic converter 19 the device 13 determines the balanced oxygen amount since a change of the algebraic sign of the difference value between the actual value of the rear oxygen sensor 19 and the target lambda ratio. Preferably the device 13 further forms an evaluation parameter depending on the balanced oxygen amount.

The control point of the rear control circuit 9 can be used to calculate the oxygen amount entered into and/or removed from the catalytic converter 19. Therefore, the oxygen input and/or output is balanced that results from the intervention of the rear control circuit. As shown in FIG. 1 here, the output of the regulator 11 is connected to the input of the device 13. This embodiment is beneficial but not mandated, in particular when simultaneously a projected balancing is used for the front control circuit 5 to compensate, for example, the influence of dynamic disturbances on the adherence of the front target values 25. In a projected balancing the oxygen input and/or output is also balanced downstream in reference to the internal combustion engine 3 and upstream in reference to the catalytic converter 19, for example, at a site of the front oxygen sensor 21, minus the influence of the rear regulator 11. Here, for example by a signal of the front oxygen sensor, the actuating variable of the front regulator 7 is deducted. Here, on average a control parameter 25 of the front control circuit 5 is maintained.

The output signals of the oxygen sensors 21 and 15 can be used for calculating the oxygen amounts entered into and/or removed from the catalytic converter 19. Alternatively, particularly when the front lambda control circuit 3 operates with a modeled actual lambda value, a modeled lambda value is used instead of the signal of the front oxygen sensor 21. In the simplest case, the device 13 uses a simple integrator for determining the inserted and removed oxygen amounts. Alternatively, more complicated oxygen models of the catalytic converter can be used to calculate the input and output of oxygen.

The evaluation parameter of the balanced oxygen amount may concern an absolute or a relative evaluation parameter. In a relative evaluation parameter the balanced oxygen amount is referenced to a predefined value of the oxygen storage capacity of the catalytic converter. The predefined value of the oxygen storage capacity can represent the maximum oxygen storage amount of the catalytic converter. Further, the defined oxygen amount can be defined depending on the features of the coating of the catalytic converter with regard to a maximally achievable conversion of contaminants for a certain contaminant, preferably the NOX, HC, or CO content.

The evaluation parameter can be selected depending on the present value of a parameter of the catalytic converter, with said parameter characterizing the condition of the catalytic converter 19. Preferably the present condition relates to the operative phase of the internal combustion engine 3 prior to the change of the algebraic sign of the difference value. Thus, it can be considered in a simple manner that the catalytic converter 19 is filled completely with oxygen after a previous drive phase of the internal combustion engine 3 or with the oxygen completely removed after a rich operation phase of the internal combustion engine 3. Further the evaluation parameter itself can be selected depending on the present value of the parameter of the catalytic converter.

A difference value is formed of the rear actual lambda ratio to the rear target lambda value from the rear control circuit 11. After the change of the algebraic sign of the difference value, the balanced oxygen amount is determined by the device 13 according to an embodiment for a time interval since the change of the algebraic sign. The actuating variable of the rear lambda control circuit 9 is additionally selected depending on this balanced oxygen amount. This way the intervention of the rear regulator and indirectly the intervention of the front regulator are dependent on the output signal of the rear oxygen sensor 15 and additionally on the balanced oxygen amount. The actuating variable of the control parameter of the rear control circuit can advantageously be determined by an engine map as well. The engine map uses the output signal of the rear oxygen sensor and the balanced oxygen amount as input parameters and determines the control parameter. The control parameter may represent, for example, a proportional parameter and/or an integral parameter.

Preferably it is provided, alternatively or additionally, to form a corrective value to increase regulator stability depending on the balanced oxygen amount.

In reference thereto, in case the actuating variable of the rear control circuit 9 is only dependent on the output signal of the rear oxygen sensor 15, a leaning and/or enriching of the mix is predetermined for the motor when said signal deviates from the defined target value of the rear control circuit until the signal has reached the target value again, and/or has fallen below it or exceeds it. By the consideration of the balanced oxygen amount according to an embodiment when selecting the actuating variable, the control quality is improved by an anticipatory design of the control.

This shall be discussed in greater detail for the case of a target value being exceeded by the signal, with the mixture being richer than intended. Here, a leaning of the mixture shall be performed until the signal of the rear oxygen sensor 15 has fallen back to the target value. As soon as the signal intersects the target value, i.e. as soon as the difference value changes its algebraic sign, the calculation of the oxygen input and/or output of the catalytic converter 19 is triggered anew by the device 13, i.e. is initially set to zero. Then the balanced oxygen amount existing in the catalytic converter 19 is calculated for a time interval after the change of the algebraic sign. Depending on the balanced oxygen amount an evaluation parameter is formed, based upon which it is decided if another input of lean exhaust gas into the catalytic converter 19 is necessary or if sufficient amounts of oxygen have already been introduced. A sufficient amount of oxygen is inserted into the catalytic converter 19 when it is sufficient for converting the contaminants the catalytic converter has been charged. Due to the fact that the catalytic converter shows a buffer effect, in particular based on the coating of the catalytic converter, even without any additional intervention of the front or the rear regulator an approach of the sensor signal towards the target value occurs. In this case a reduction of the intervention of the front and/or rear lambda regulator can occur. In case that more oxygen is removed from the catalytic converter 19 than initially intended an increase of the intervention can also occur.

LIST OF REFERENCE CHARACTERS

1 Device
3 Internal combustion engine
4 Arrow
5 Front control circuit
7 Front regulator
9 Rear control circuit
11 Rear regulator
13 Modeling unit
15 Rear oxygen sensor
17 Exhaust system
19 Catalytic converter
21 Front oxygen sensor
23 Target value path
25 Target value input
27 Addition site
29 Subtraction site
31 Arrow
31' Arrow

What is claimed is:

1. A method for an lambda control of an internal combustion engine with at least one catalytic converter allocated to an exhaust system of the internal combustion engine, with the exhaust system comprising a front lambda control circuit and a rear lambda control circuit with at least one rear oxygen sensor arranged downstream in reference of the catalytic converter, the method comprising the steps of:
   processing an output signal of the rear oxygen sensor by the rear lambda control circuit,
   forming a difference value between the output signal and a target lambda value, and
   issuing an actuating variable influencing the front lambda control circuit depending on the difference value,
   wherein after a change of the algebraic sign of the difference value, determining a balanced oxygen amount for a predetermined temporal interval since the change of the algebraic sign from the oxygen amount entered into the catalytic converter and removed therefrom, and
   selecting the actuating variable of the rear lambda control circuit additionally depending on the determined balanced oxygen amount.

2. The method according to claim 1, comprising the following additional step:
   forming an evaluation parameter to increase regulator stability depending on the balanced oxygen amount.

3. The method according to claim 1, comprising the following additional step:
   determining an actuating variable acting on the control parameter of the rear lambda control circuit using an engine map, which processes the output signal of the rear oxygen sensor and the evaluation parameter as an input parameter and/or
   determining a correction factor for the actuating variable.

4. The method according to claim 2, wherein an absolute evaluation parameter is used.

5. The method according to claim 2, wherein a relative evaluation parameter is used based on a predetermined oxygen storage capacity of the catalytic converter.

6. The method according to claim 5, wherein the predetermined oxygen storage capacity is a maximum oxygen storage capacity of the catalytic converter.

7. The method according to claim 5, wherein the predetermined oxygen storage capacity is equivalent to a maximum conversion of contaminants for a predetermined contaminant, preferably NOX, HC, or CO content of an exhaust gas of the internal combustion engine.

8. The method according to claim 7, wherein the evaluation parameter and/or the predetermined oxygen storage capacity is selected depending on the actual value of a parameter of the catalytic converter.

9. The method according to claim 8, wherein the present value of the parameter of the catalytic converter is equivalent to a catalytic converter being completely stocked with oxygen and/or the oxygen being completely removed therefrom.

10. The method according to claim 8, wherein the front lambda control circuit is provided with a front oxygen sensor arranged downstream in reference to the internal combustion engine and upstream in reference to the catalytic converter or that a modeled lambda ratio is provided for the front lambda control circuit.

11. The method according to claim 1, wherein the inserted and removed oxygen amount is considered from the determination of the balanced oxygen amount resulting from the intervention of the rear control circuit.

12. The method according to claim 1, wherein a projected balancing of the oxygen amount is used for the front control circuit at a location downstream in reference to the internal combustion engine and upstream in reference to the catalytic converter.

13. A device for the lambda control in an internal combustion engine comprising at least one catalytic converter arranged in an exhaust system of the internal combustion engine, wherein the exhaust system is provided with a front lambda control circuit and a rear lambda control circuit having at least one rear oxygen sensor arranged downstream in reference to the catalytic converter and wherein the rear lambda control circuit is operable to process an output signal of the rear oxygen sensor, to form a difference value between the output value and the rear target lambda value and to output an actuating variable acting on the target lambda value of the front lambda control circuit depending on the difference value, further comprising a device operable to determine a balanced oxygen amount of the catalytic converter from the oxygen amounts entered into and removed from the catalytic converter and to determine the balanced oxygen amount after a change of the algebraic sign of the difference value for a predetermined time interval after the change of the algebraic sign and wherein the rear lambda control circuit is designed to determine the actuating variable in addition depending on the balanced oxygen amount.

14. The device for the lambda control according to claim 13, wherein the actuating variable of the rear lambda control circuit acts on a target lambda path of the front lambda control circuit.

15. The device according to claim 13, wherein the front lambda control circuit is provided with a front oxygen sensor arranged downstream in reference to the internal combustion engine and upstream in reference to the catalytic converter.

16. The device for the lambda control according to claim 13, wherein the device for determining the balanced oxygen amount comprises an integrator to determine the entered oxygen amount.

17. An arrangement for an lambda control of an internal combustion engine comprising:
at least one catalytic converter allocated to an exhaust system of the internal combustion engine,
a front lambda control circuit and a rear lambda control circuit with at least one rear oxygen sensor arranged downstream in reference of the catalytic converter,
means for processing an output signal of the rear oxygen sensor by the rear lambda control circuit,
means for forming a difference value in reference to a target lambda value, and
means for issuing an actuating variable influencing the front lambda control circuit,
means for determining a balanced oxygen amount after a change of the algebraic sign of the difference value for a temporal interval since the change of the algebraic sign from the oxygen amount entered into the catalytic converter and removed therefrom, and
means for selecting the actuating variable of the rear lambda control circuit additionally depending on the balanced oxygen amount.

18. The arrangement according to claim 17, further comprising means for forming an evaluation parameter to increase regulator stability depending on the balanced oxygen amount.

19. The arrangement according to claim 17, further comprising means for determining an actuating variable acting on the control parameter of the rear lambda control circuit using an engine map, which processes the output signal of the rear oxygen sensor and the evaluation parameter as an input parameter and/or
means for determining a correction factor for the actuating variable.

20. The arrangement according to claim 18, wherein an absolute evaluation parameter is used.

* * * * *